Oct. 26, 1965 W. DILLENBURGER 3,214,709
ARRANGEMENT FOR PRODUCING AN OUTPUT SIGNAL
FREQUENCY-MODULATED BY A VIDEO SIGNAL
Filed Sept. 29, 1960 2 Sheets-Sheet 1

Inventor:
Wolfgang Dillenburger
by Michael S. Striker
Attorney

INVENTOR
WOLGANG DILLENBURGER

BY Michael S. Striker

ATTORNEY

United States Patent Office 3,214,709
Patented Oct. 26, 1965

3,214,709

ARRANGEMENT FOR PRODUCING AN OUTPUT SIGNAL FREQUENCY-MODULATED BY A VIDEO SIGNAL

Wolfgang Dillenburger, Niederramstadt, near Darmstadt, Germany, assignor to Fernseh G.m.b.H., Darmstadt, Germany Filed Sept. 29, 1960, Ser. No. 59,328
Claims priority, application Germany, Oct. 2, 1959, F 29,514
12 Claims. (Cl. 332—16)

Figures 1, 2:
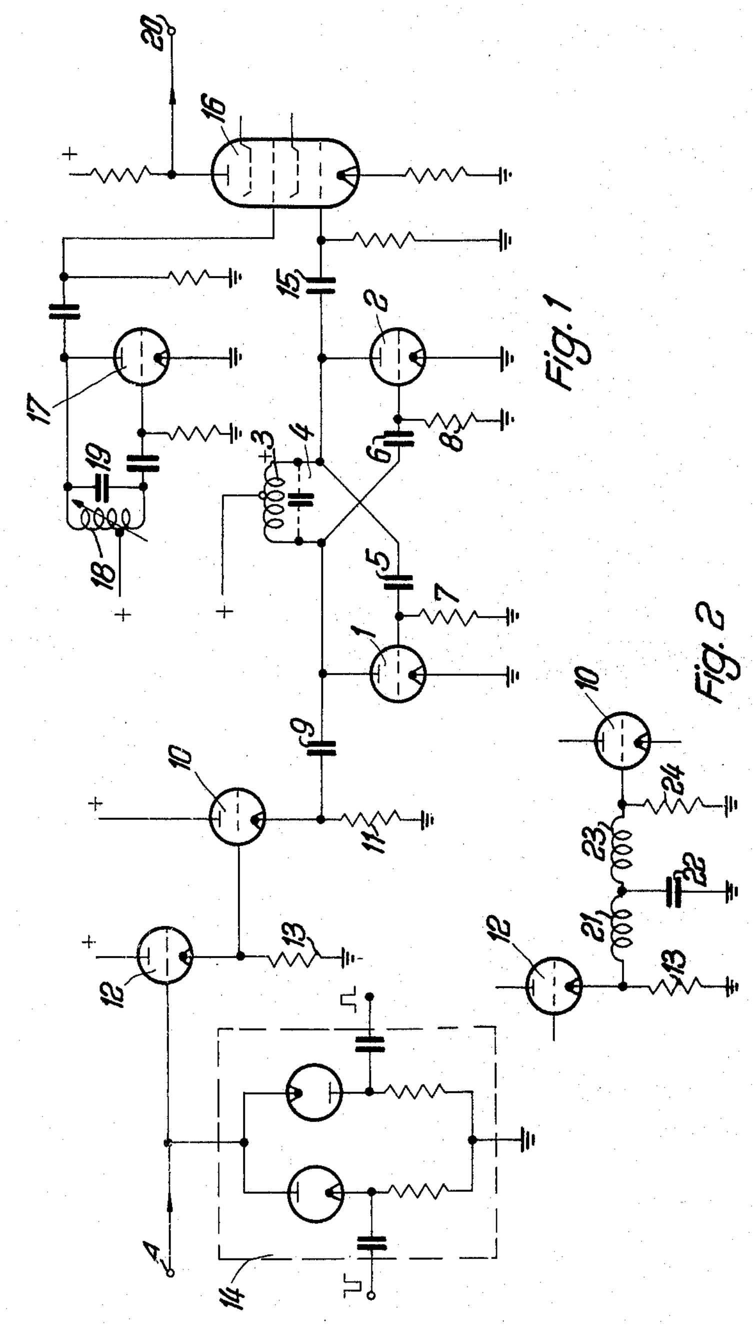

The present invention concerns an arrangement for producing an output signal which is frequency-modulated by the input of a video signal and particularly suited for being magnetically recorded.

In arrangements of this type it is advisable to choose as a carrier frequency of the output signal a frequency of the order of the modulating video signal frequencies, and preferably the carrier frequency of the output signal should be only slightly higher than the highest occurring modulating video signal frequency.

Where a video signal is used for the frequency-modulation of a carrier frequency, the range occupied by the modulating frequencies occupies a broad frequency band which extends from a very low frequency of about 50 c.p.s. up to very high frequencies of several megacycles, e.g., by European standards up to 5 megacycles. Under such conditions it is very difficult to provide for and to obtain a satisfactory frequency characteristic of the arrangement, and to avoid the appearance of the modulating frequency in the frequency-modulated output signal. Moreover it is of great importance to maintain with sufficient accuracy a fixed relation between each modulation amplitude and the corresponding frequency in the frequency-modulated output signal.

It has been found that these requirements or desirable qualities are only unsatisfactorily met by the known arrangements of the type set forth.

It is therefore a main object of this invention to provide for an arrangement for the purpose set forth which yields more satisfactory results.

It is a further object of this invention to provide for an arrangement of the type mentioned which is comparatively simple in its structure and reliable in operation.

It is to be understood that it is well known to produce a frequency-modulated output signal by controlling the frequency of a multivibrator. However, if in such arrangements the modulating potential is applied to the control grids of the multivibrator tubes, then it cannot be avoided that the frequency characteristic of the video signal drops remarkably in the high frequency range because the grid leakage resistors through which the video signal is applied to the multivibrator must not have a resistance smaller than a certain minimum value which results, in view of the unavoidable capacitance at the control electrode of the multivibrator, in a reduction of the modulating voltage in the range of the high frequencies. Moreover, it is known that the frequency of a multivibrator can be controlled in a simple manner and varied within wide limits by application of varying potentials to its electrodes, but due to this very characteristic it is practically impossible to maintain a particular frequency accurately, particularly when the operating point is shifted or the bias potential is changed.

With above objects in view, an arrangement according to the invention for producing an output signal frequency-modulated by the input of a video signal comprises, in combination, input means for introducing a video signal including a direct current component; first oscillator means for generating a carrier frequency, said first oscillator means having a resonance circuit and at least one terminal permitting the introduction of a signal for frequency-modulating said carrier frequencies thereby; at least one cathode follower and an impedance means connected between said input means and said terminal, the grid of said cathode follower being connected to said input means, and said impedance means and the grid-cathode path of said cathode follower forming a series-combination connected in parallel with said resonance circuit, for causing frequency-modulation of said carrier frequency by said video signal; and output means for delivering an output signal frequency-modulated by said video signal.

In a preferred embodiment of the invention an arrangement for producing an output signal frequency-modulated by the input of a video signal comprises, in combination, input means for introducing a video signal including a direct current component; first oscillator means for generating a carrier frequency of the order of a multiple of the highest occurring video signal frequency, said first oscillator means having a resonance circuit and at least one terminal permitting the introduction of a signal for frequency-modulating said carrier frequency thereby; at least one cathode follower and an impedance means connected between said input means and said terminal, the grid of said cathode follower being connected to said input means, and said impedance means and the grid-cathode path of said cathode follower forming a series-combination connected in parallel with said resonance circuit, for causing frequency-modulation of said carrier frequency by said video signals; second oscillator means for generating an auxiliary frequency differing from said carrier frequency, the difference frequency being of the order of said highest occurring video signal frequencies; and mixer means connected with the output, respectively, of said first and second oscillator means for mixing said auxiliary frequency with said frequency-modulated carrier frequency and having output means for delivering an output signal consisting of said difference frequency-modulated by said video signal.

It may be pointed out at this point that the arrangement according to the invention entails the remarkable advantage that it is possible without difficulties to separate the frequency-modulated signal from the modulating frequencies on account of the great difference between the respective frequency ranges. Moreover, there is always a fixed relation between the individual amplitude values of the modulating video signal and the corresponding frequencies of the frequency modulated output signal because the oscillator means having resonance circuits can be built without difficulty so as to have great frequency stability. Also, it is possible by simple means to adjust the auxiliary frequency furnished by the second oscillator to the mixer stage and thereby to adjust the frequency level of the frequency-modulated output signal to a desirable value.

In a preferred embodiment of the invention the first oscillator the output frequency whereof is modulated by the video signal, is of the push-pull type comprising two amplifier tubes. The frequency-controlled series-combination containing an apparent impedance is connected with the anode of one of the tubes of the push-pull oscillator, and the output of the frequency-modulated signal which is then transmitted to the mixer stage can be derived advantageously from the anode of the second tube of the push-pull oscillator.

It is further possible and in certain cases even advantageous to carry out the frequency-modulation of the oscillator output by connecting a series-combination as mentioned above to the first tube and a similar series-combination also to the other one of the tubes of the push-pull oscillator.

Figure 3:
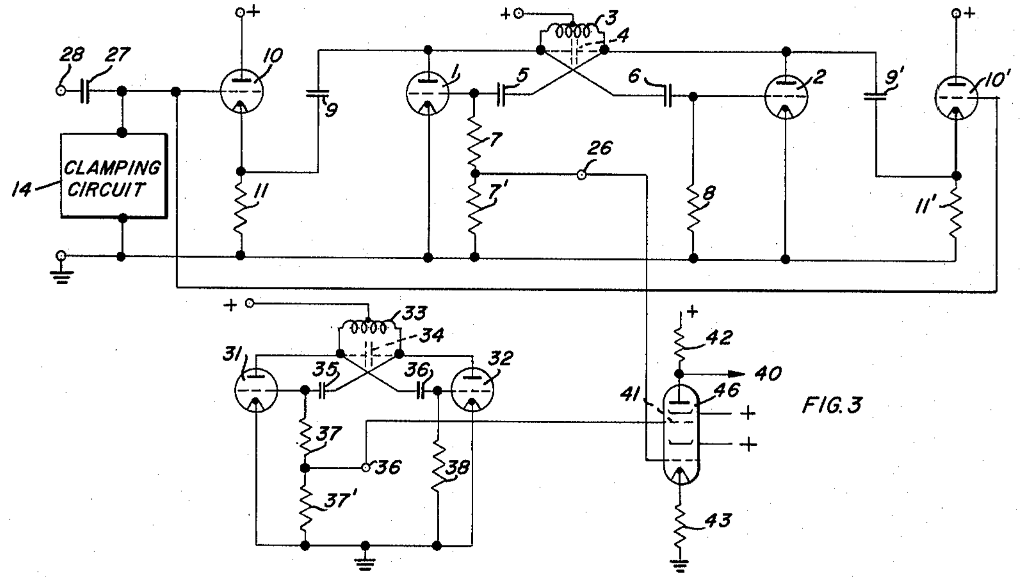
Figure 4:
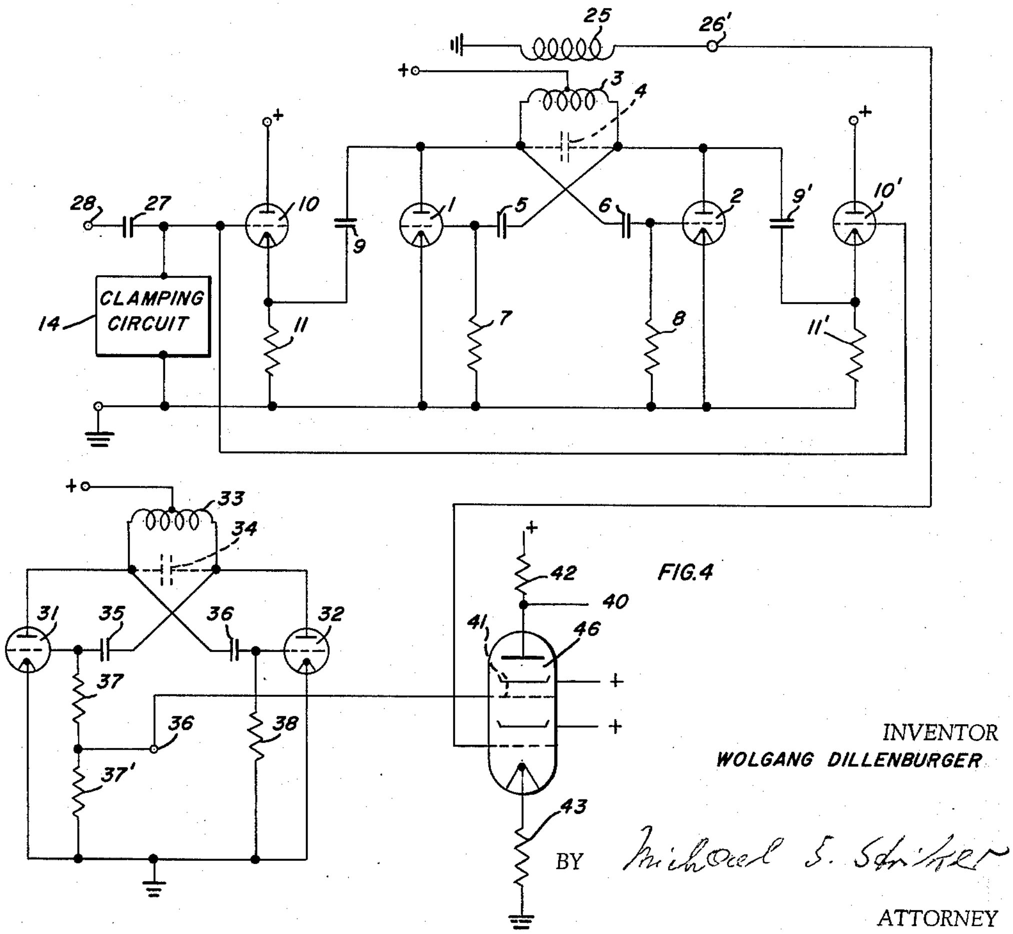

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a circuit diagram illustrating one embodiment of the invention, namely, an arrangement comprising as the first oscillator means a push-pull oscillator and including a second cathode follower connected between the input means and the first cathode follower;

FIG. 2 is a partial circuit diagram illustrating the insertion, between the two cathode followers, of means for preventing the transmission of the oscillator frequency output to the input means of the arrangement of FIG. 1; and FIG. 3 is a circuit diagram illustrating a modification of the oscillator portion of FIG. 1, both tubes of the push-pull oscillator being connected each with a series-combination for introducing the modulating frequency; and FIG. 4 is a circuit diagram illustrating a modification of the arrangement according to FIG. 3.

In the arrangement illustrated by FIG. 1 and comprising a plurality of electron tubes as components a first oscillator is provided having tubes 1 and 2 in push-pull arrangement. A resonance circuit is connected between the anodes of the tubes 1 and 2 and comprises an inductance coil 3 while the necessary capacitance connected in parallel therewith is constituted by the pertaining tubes and the connecting lines. However, if desired a suitable capacitor 4 may be connected in parallel with the coil 3 as is indicated by dotted lines. This first oscillator operates at a frequency of 50 megacycles per second which is in the order of a multiple of the highest conventional modulation frequency of a video signal, e.g., ten times the value of the highest modulation frequency of a video signal according to the European standard of 5 megacycles per second. The feedback coupling of the push-pull oscillator is provided by the interconnections between the anode of each one of the tubes with the grid of the other one of the tubes, respectively, via the condensers 5 and 6, respectively. The control grids of the tubes 1 and 2 are connected via leakage resistors 7 and 8, respectively, with ground or a grounded reference line to which the cathodes of the tubes are connected. The positive anode potential is applied to the tubes 1 and 2 by means of a center tap of the coil 3 as can be seen from FIG. 1.

The modulation of the output frequency of the push-pull oscillator in dependence on the amplitudes of the modulating video signal is provided for by a connection between one terminal of the oscillator, namely a terminal in the anode circuit of the one oscillator tube 1, via a condenser 9, with the output terminal of a cathode follower 10 having a cathode resistor 11. For reasons set forth further below the modulating video signal is applied to the grid of the cathode follower 10 through another cathode follower stage 12, 13. The apparent output impedance of the cathode follower stage 10 varies in response to the varying modulation potential applied to its grid so that the resistance between the condenser 9 and the grounded reference line varies accordingly. Depending upon the value of this resistance the influence of the condenser 9 on the output frequency produced by the push-pull oscillator varies accordingly. Thus, the high carrier frequency furnished by the first oscillator is frequency modulated in accordance with the input of the video signal. It can be seen that use of a cathode follower stage as a variable resistance in this arrangement entails the advantage that the controlling resistance is sufficiently small so as to exert the desired influence on the resonance frequency of the relatively strongly attenuated resonance circuit.

As mentioned above, the cathode follower stage 10 is controlled by the second cathode follower stage 12 having the cathode resistor 13. The modulating video signal is applied from an input terminal as shown to the control grid of the cathode follower 12. The potential at the grid of the tube 12 is stabilized by means of a double clamping circuit 14, composed of a conventional positive clamping circuit and a conventional negative clamping circuit, for a fixed periodically appearing potential value of the video signal, preferably that of the black level or that of the synchronizing pulse interval. The two clamping circuits are operated with the aid of positive and negative pulses, respectively, as indicated, which are available from the circuit arrangement that furnishes the video signals at the input A. However, to assure a satisfactory operation of the clamping circuit it is important that only the video signal appear at the grid of the tube 12 controlled by the clamping circuit, while the injection of the high-frequency potential furnished by the push-pull oscillator is prevented. The appearance of a high frequency potential in the input circuit would have the effect that the high frequency voltage is rectified by the diodes of the clamping circuit 14 whereby the operating point on the characteristic of the tube 12 would be shifted in an entirely undesirable and unpredictable way. However, by the insertion of a second cathode follower stage 12 between the first mentioned cathode follower stage 10 and the video signal input A, any transmission of the high frequency of the push-pull oscillator to the clamping circuit 14 is most satisfactorily avoided. The high frequency voltage reaching the cathode of the tube 10 via the condenser 9 is transmitted through the grid-cathode capacitance of the tube 10 to the grid of the tube 10. However, due to the small output impedance of the cathode follower stage 12 a great portion of the high frequency potential appearing at the grid of the tube 10 is drained off to such an extent that the remaining residual voltage which is transmitted via the grid-cathode capacitance of the tube 12 to the grid of this tube has so small a value that it cannot any more interfere with the operation of the clamping circuit 14.

If in view of the characteristics of the tubes used in the arrangement, the need should arise then the circuit between the cathode followers 10 and 12 may be supplemented as shown by FIG. 2, by a limiting filter circuit comprising inductances 21, 23, a capacitance 22 and a resistance 24 as shown. By this filter arrangement the high carrier frequency is safely prevented from reaching the tube 12. Thus it is assured that the momentary output frequency of the push-pull oscillator is unequivocally determined by the amplitudes of the modulating video signal appearing as potential at the grid of the tube 12 and that a definite predetermined frequency of the push-pull oscillator corresponds to that amplitude value which is stabilized by the clamping circuit.

In order to transpose the frequency modulated output carrier frequency furnished by the push-pull oscillator to a frequency level which is suitable for recording the frequency modulated signal on a magnetic recording tape the just-mentioned frequency modulated high frequency carrier frequency is applied to a mixer stage 16 where it is mixed with a second frequency. The mixer stage may consist mainly of a multigrid tube as shown, one grid of which is connected via a condenser 15 with the output terminal of the push-pull oscillator. A second grid of the tube 16 is connected with a second oscillator having a tube 17 and a resonance circuit 18, 19, as shown. This second oscillator is tuned to a frequency different from the output carrier frequency furnished by the first oscillator so that at the output 20 of the mixer stage 16 a frequency equal to the difference between the output frequency of the first and second oscillator is available. In the present example where the carrier frequency output of the first oscillator is assumed to be 50 megacycles per second the frequency of the second oscillator is 56 megacycles per second so that the output frequency at the terminal 20 is 6 megacycles per second corresponding to the black level of the video signal provided that the frequency of 50 megacycles per second also corresponds to the black level amplitude of the video signal. The just described arrangement is particularly advantageous because at least one of the frequency determining elements, namely the coil 18 or the capacitor 19 of the resonance circuit of the second oscillator can be variable so that the output frequency of the second oscillator can be adjusted in a simple manner whereby also the frequency level of the output signal appearing at the output terminal 20 can be adjusted or changed without in any way affecting the operation of the push-pull oscillator. In particular, the frequency swing of the frequency modulation is not altered.

FIG. 3 illustrates a further modification of the basic circuit illustrated by FIG. 1. The first oscillator is again a push-pull type oscillator having tubes 1 and 2, a resonance circuit, composed of the coil 3 and a parallel capacitance 4, coupling condensers 5 and 6, e.g. of 330 pf., and two grid leakage resistors 7 and 8, each e.g. of 500 ohms, the resistor 7 being subdivided by a tapping point so as to have a portion 7' of e.g. 200 ohms. Again a cathode follower stage 10, 11 is connected via a condenser 9 with a terminal of the push-pull oscillator in the anode circuit of the tube 1. The tube 10 may be e.g. a triode of the commercial type E88CC, the cathode resistor 11 may have a resistance of e.g. 500 ohms, and the condenser 9 may have a capacitance of e.g. 15 pf. The video signal is applied to the input terminal 28 and from there across a capacitor 27 to the grid of the tube 10. A clamping circuit 14 is provided as shown in a manner similar to FIG. 1. The second cathode follower stage 12, 13 between the cathode follower 10 and the input is omitted. However, a second cathode follower stage comprising a tube 10', cathode resistor 11' and coupling capacitor 9' is provided and connected to a terminal of the push-pull oscillator in the anode circuit of the tube 2. The control grids of the two cathode follower tubes 10 and 10' are connected in parallel to the input 28, as shown. The operating point of the two tubes 10 and 10' can be stabilized by the clamping circuit 14 for a fixed predetermined value of the video signal, preferably for the black level amplitude thereof. In this case the frequency modulated carrier frequency output of the push-pull oscillator is transmitted from a junction point between resistor portions 7 and 7' via the output terminal 26 to the mixer stage 46 which may be a multi-grid tube having one grid connected with the push-pull oscillator output 26 in a manner similar to that shown in FIG. 1, and also having another grid 41 similarly connected to a second oscillator. This second oscillator comprises, similarly to the above described push-pull oscillator, tubes 31 and 32, a resonance circuit composed of the coil 33 and a parallel capacitor 34, coupling capacitors 35, 36 and grid leakage resistors 37, 37'; and 38, respectively. The junction point between the resistor portions 37, 37' is connected via an output terminal 36 with said other grid 41 of the mixer tube 46. This tube is supplemented by cathode resistor 43 and anode resistor 42. At its output terminal 40 an output carrier frequency is delivered having a frequency equal to the difference between the output frequencies of the push-pull oscillator and of the second oscillator.

The advantage of the arrangement according to FIG. 3 resides in the fact that the modulating signal appears at the anodes of the two oscillator tubes 1 and 2 at equal magnitudes and is therefore not transmitted to the output circuit. On the other hand, the high frequency voltage of the oscillator is transmitted via the condensers 9, 9', respectively and the grid-cathode capacitances of the tube 10, 10', respectively, in opposite phases to the grid electrode thereof so that the high frequency voltage pulses compensate each other in the common connection between the grids of the tubes 10 and 10' to which the clamping circuit 14 is connected. Consequently the operation of the clamping circuit 14 cannot be affected by the high frequency output of the push-pull oscillator. Therefore no other means are required for preventing the high frequency voltage of the push-pull oscillator from reaching the modulating circuit, as was provided by the second cathode follower stage 12, 13 in FIG. 1 or the additional filter arrangement according to FIG. 2.

FIG. 4 illustrates a modification of the arrangement of FIG. 3. In this case the output frequency of the push-pull oscillator is transmitted from the coil 3 by inductive coupling to a coil 25 forming part of the output circuit and being connected between ground and the terminal 26'. This terminal is connected with one grid of the mixer tube 46 in a manner analogous to the connection of the latter with terminal 26 in FIG. 3.

Thus all the requirements specified at the outset are most satisfactorily met and particularly a frequency-modulated signal suited for being tape recorded is obtained.

It will be understood that each of the elements described above or two or more together, may also find a useful application in other types of arrangements for producing an output signal frequency-modulated by the input of a video signal differing from the types described above.

While the invention has been illustrated and described as embodied in an arrangement for producing an output signal frequency-modulated by the input of a video signal, particularly an output signal suitable for being tape-recorded, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the follownig claims.

What is claimed and desired to be secured by Letters Patent is:

1. An arrangement for producing an output signal frequency-modulated by the input of a video signal, comprising, in combination, input means for introducing a video signal including a direct current component; first oscillator means for generating a carrier frequency of the order of a multiple of the highest occurring video signal frequency, said first oscillator means having a generating portion and a resonance circuit determining said carrier frequency connected between a source of electric energy and said generating portion, and at least one terminal of said generating portion being connected with said input means for permitting the introduction of said video signal for frequency-modulating said carrier frequency thereby; two cathode follower stages connected between said input means and said first oscillator means, impedance means forming with the grid-cathode path of at least one of said cathode follower stages a series-combination connected in series with said resonance circuit, for causing frequency-modulation of said carrier frequency by said video signal; second oscillator means for generating an auxiliary frequency differing from said carrier frequency, the difference frequency being of the order of said highest occurring video signal frequency; and mixer means connected with the outputs, respectively, of said first and second oscillator means for mixing said auxiliary frequency with said frequency-modulated carrier frequency and having output means for delivering an output signal consisting of said difference frequency frequency-modulated by said video signal.

2. An arrangement for producing an output signal frequency-modulated by the input of a video signal, comprising, in combination, input means for introducing a video signal including a direct current component; first oscillator means for generating a carrier frequency of the order of a multiple of the highest occurring video signal frequency, said first oscillator means having a generating portion and a resonance circuit determining said carrier frequency connected between a source of electric energy and said generating portion, and at least one terminal of said generating portion being connected with said input means for permitting the introduction of said video signal for frequency-modulating said carrier frequency thereby; a first cathode follower stage having a grid-connected to said input means, and a second cathode follower stage and an impedance means connected between said first cathode follower stage and said terminal, the grid of said second cathode follower stage being connected to the cathode of said first cathode follower stage, and said impedance means and the grid-cathode path of said second cathode follower stage forming a series-combination connected in series with said resonance circuit, for causing frequency-modulation of said carrier frequency by said video signal; second oscillator means for generating an auxiliary frequency differing from said carrier frequency, the difference frequency being of the order of said highest occurring video signal frequency; and mixer means connected with the outputs, respectively, of said first and second oscillator means for mixing said auxiliary frequency with said frequency-modulated carrier frequency and having output means for delivering an output signal consisting of said difference frequency frequency-modulated by said video signal.

3. An arrangement as claimed in claim 2, wherein filter means for suppressing said carrier frequency are inserted between said first and second cathode follower stages.

4. An arrangement as claimed in claim 1, wherein said first oscillator means comprises two electron tubes connected for push-pull operation.

5. An arrangement as claimed in claim 2, wherein said first oscillator means comprises two electron tubes connected for push-pull operation.

6. An arrangement for producing an output signal frequency-modulated by the input of a video signal, comprising, in combination, input means for introducing a video signal including a direct current component; first oscillator means for generating a carrier frequency of the order of a multiple of the highest occurring video signal frequency, said first oscillator means having two electron tubes connected for push-pull operation and a resonance circuit determining said carrier frequency connected between a source of electric energy and said two electron tubes, and one terminal connected between said input means and the output electrode of one of said tubes and permitting the introduction of said video signal for frequency-modulating said carrier frequency thereby, and a second terminal connected to the output electrode of the other one of said tubes; two cathode follower stages connected in cascade between said input means and said first oscillator means, impedance means forming with the grid-cathode path of one of said cathode follower stages a series-combination connected in series with said resonance circuit, for causing frequency-modulation of said carrier frequency by said video signal; second oscillator means for generating an auxiliary frequency differing from said carrier frequency, the difference frequency being of the order of said highest occurring video signal frequency; and mixer means connected with said second terminal of said first oscillator means and with the output of said second oscillator means, respectively, for mixing said auxiliary frequency with said frequency-modulated carrier frequency and having output means for delivering an output signal consisting of said difference frequency frequency-modulated by said video signal.

7. An arrangement for producing an output signal frequency-modulated by the input of a video signal, comprising, in combination, input means for introducing a video signal including a direct current component; first oscillator means for generating a carrier frequency of the order of a multiple of the highest occurring video signal frequency, said first oscillator means having two electron tubes connected for push-pull operation and a resonance circuit determining said carrier frequency connected between a source of electric energy and said two electron tubes, and one terminal connected between said input means and the output electrode of one of said tubes and permitting the introduction of said video signal for frequency-modulating said carrier frequency thereby, and a second terminal connected to the output electrode of the other one of said tubes; a first cathode follower stage and a first impedance means connected between said input means and said one terminal, the grid of said cathode follower stage being connected to said input means, and said first impedance means and the grid-cathode path of said first cathode follower stage forming a series-combination connected in series with said resonance circuit, for causing frequency-modulation of said carrier frequency by said video signal; a second cathode follower means, and a second impedance means connected in series with the grid-cathode path of said second cathode follower means to said second terminal, for contributing to said frequency-modulation of said carrier frequency by said video signal, the grid of said second cathode follower means being connected with said grid of said first cathode follower means for producing phase-compensation between the high frequencies appearing at said grids; second oscillator means for generating an auxiliary frequency differing from said carrier frequency, the difference frequency being of the order of said highest occurring video signal frequency; and mixer means coupled with said first oscillator means, and connected with the output of said second oscillator means for mixing said auxiliary frequency with said frequency-modulated carrier frequency and for producing said difference frequency, and having output means for delivering an output signal consisting of said difference frequency frequency-modulated by said video signal.

8. An arrangement for producing an output signal frequency-modulated by the input of a video signal, comprising, in combination, input means for introducing a video signal including a direct current component; first oscillator means for generating a carrier frequency of the order of a multiple of the highest occurring video signal frequency, said first oscillator means having two electron tubes connected for push-pull operation and a resonance circuit determining said carrier frequency connected between a source of electric energy and said two electron tubes, and one terminal connected between said input means and the output electrode of one of said tubes and permitting the introduction of said video signal for frequency-modulating said carrier frequency thereby, and a second terminal connected to the output electrode of the other one of said tubes; a first cathode follower stage and a first impedance means connected between said input means and said one terminal, the grid of said cathode follower stage being connected to said input means, and said first impedance means and the grid-cathode path of said first cathode follower stage forming a series-combination connected in series with said resonance circuit, for causing frequency-modulation of said carrier frequency by said video signal; a second cathode follower means, and a second impedance means connected in series with the grid-cathode path of said second cathode follower means to said second terminal for contributing to said frequency-modulation of said carrier frequency by said video signal, the grid of said second cathode follower means being connected with said grid of said first cathode follower means for producing phase-compensation between the high frequencies appearing at said grids; second oscillator means for generating an auxiliary frequency differing from said carrier frequency, the difference frequency being of the order of said highest occurring video signal frequency; and mixer means resistance coupled with said first oscillator means, and connected with the output of said second oscillator means for mixing said auxiliary frequency with said frequency-modulated carrier frequency and for producing said difference frequency, and having output means for delivering an output signal consisting of said difference frequency frequency-modulated by said video signal.

9. An arrangement as claimed in claim 6, wherein said second oscillator means includes a tunable resonance circuit determining said auxiliary frequency, whereby the frequency level of said output signal is variable without affecting the operation of said first oscillator means.

10. An arrangement as claimed in claim 9, wherein said second oscillator means includes a tunable resonance circuit determining said auxiliary frequency, whereby the frequency level of said output signal is variable without affecting the operation of said first oscillator means.

11. An arrangement as claimed in claim 10, wherein said second oscillator means includes a tunable resonance circuit determining said auxiliary frequency, whereby the frequency level of said output signal is variable without affecting the operation of said first oscillator means.

12. An arrangement for producing an output signal frequency-modulated by the input of a video signal, comprising, in combination, input means for introducing a video signal including a direct current component; first oscillator means for generating a carrier frequency of the order of a multiple of the highest occuring video signal frequency, said first oscillator means having two electron tubes connected for push-pull operation and a resonance circuit determining said carrier frequency connected between a source of electric energy and said two electron tubes, and one terminal connected between said input means and the output electrode of one of said tubes and permitting the introduction of said video signal for frequency-modulating said carrier frequency thereby, and a second terminal connected to the output electrode of the other one of said tubes; a first cathode follower stage and a first impedance means connected between said input means and said one terminal, the grid of said cathode follower stage being connected to said input means, and said first impedance means and the grid cathode path of said first cathode follower stage forming a series-combination connected in series with said resonance circuit, for causing frequency-modulation of said carrier frequency by said video signal; a second cathode follower means, and a second impedance means connected in series with the grid-cathode path of said second cathode follower means to said second terminal for contributing to said frequency-modulation of said carrier frequency by said video signal, the grid of said second cathode follower means being connected with said grid of said first cathode follower means for producing phase-compensation between the high frequencies appearing at said grids; second oscillator means for generating an auxiliary frequency differing from said carrier frequency, the difference frequency being of the order of said highest occurring video signal frequency; and mixer means inductively coupled with said resonance circuit of said first oscillator means, and connected with the output of said second oscillator means for mixing said auxiliary frequency with said frequency-modulated carrier frequency and for producing said difference frequency, and having output means for delivering an output signal consisting of said difference frequency frequency-modulated by said video signal.

References Cited by the Examiner

UNITED STATES PATENTS

| | | | |
|---|---|---|---|
| 2,422,449 | 6/47 | Usselman | 332—14 X |
| 2,437,872 | 3/48 | Bailey | 332—27 X |
| 2,863,122 | 12/58 | Finkel et al. | 332—16 |
| 2,935,700 | 5/60 | Richter | 332—16 |
| 2,974,294 | 3/61 | Ravenscroft | 332—16 |

ROY LAKE, *Primary Examiner.*

L. MILLER ANDRUS, ALFRED L. BRODY, *Examiners.*